(No Model.) 3 Sheets—Sheet 2.
J. W. PERKINSON & C. E. MERRIFIELD.
STRAW STACKER.
No. 275,941. Patented Apr. 17, 1883.
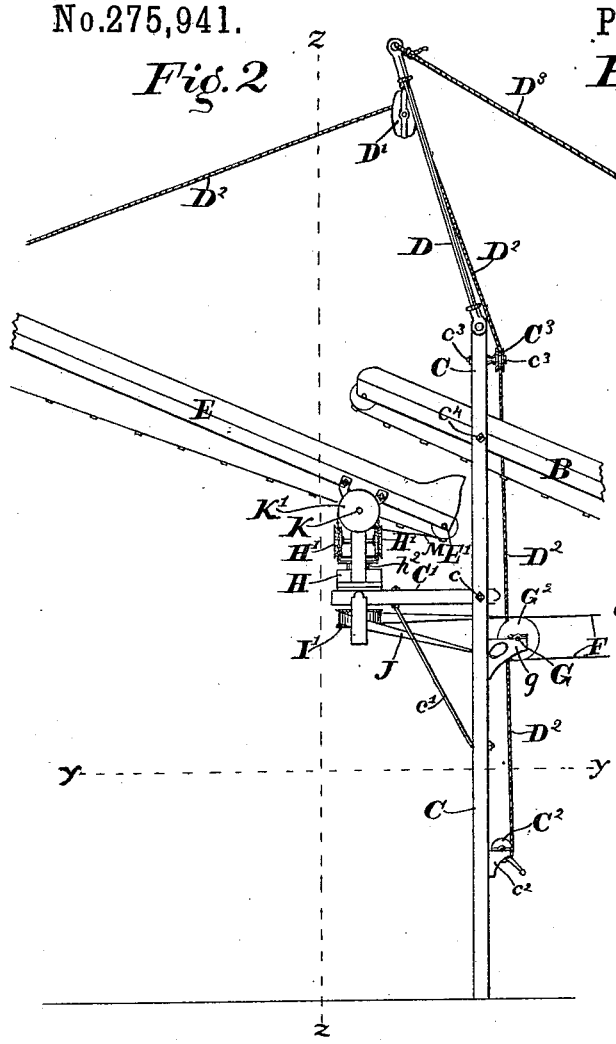
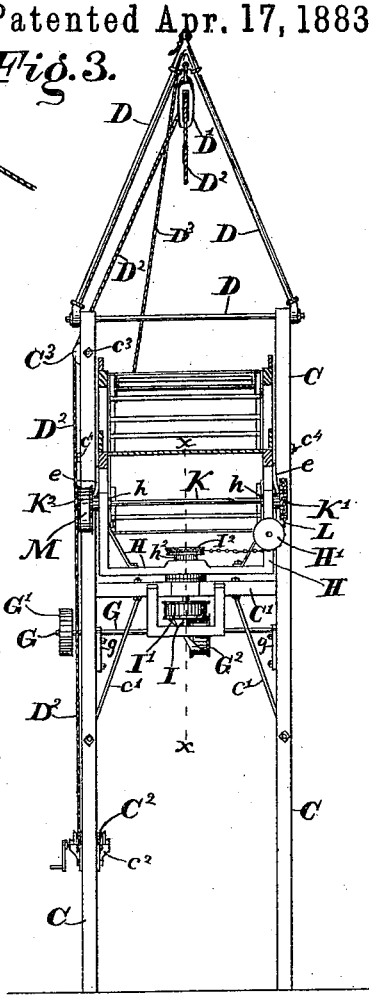
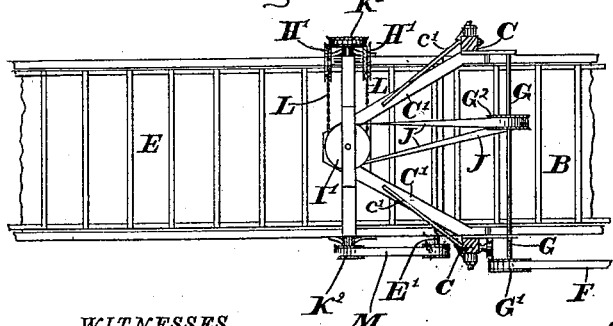
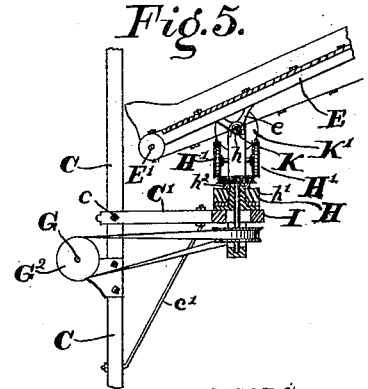
WITNESSES.
Chas. N. Leonard.
E. W. Bradford.
INVENTORS.
James W. Perkinson,
and Charles E. Merrifield,
PER
C. Bradford,
ATTORNEY.

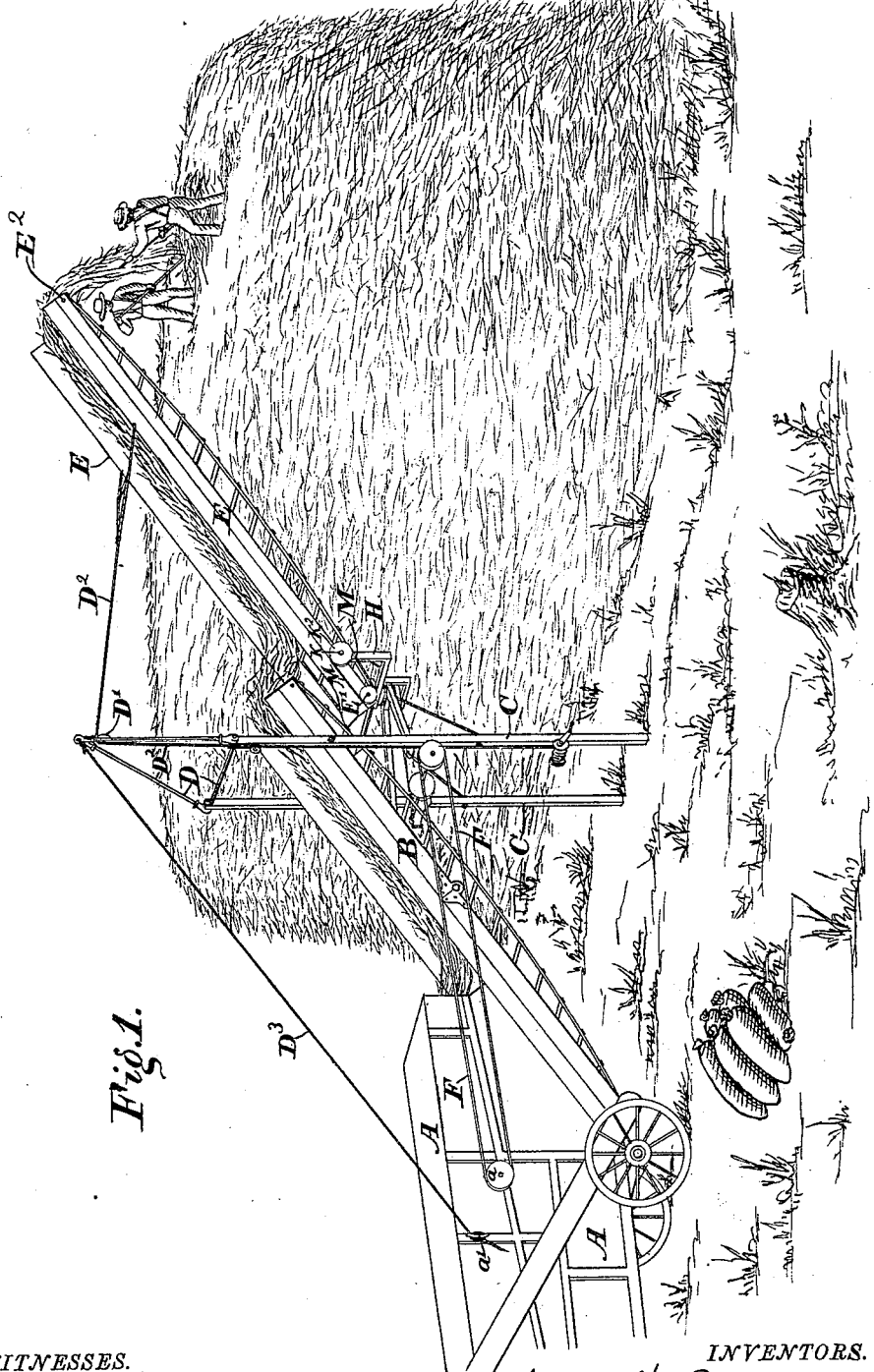

(No Model.) 3 Sheets—Sheet 3.
J. W. PERKINSON & C. E. MERRIFIELD.
STRAW STACKER.
No. 275,941. Patented Apr. 17, 1883.
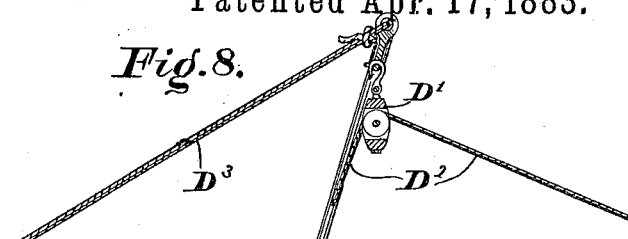
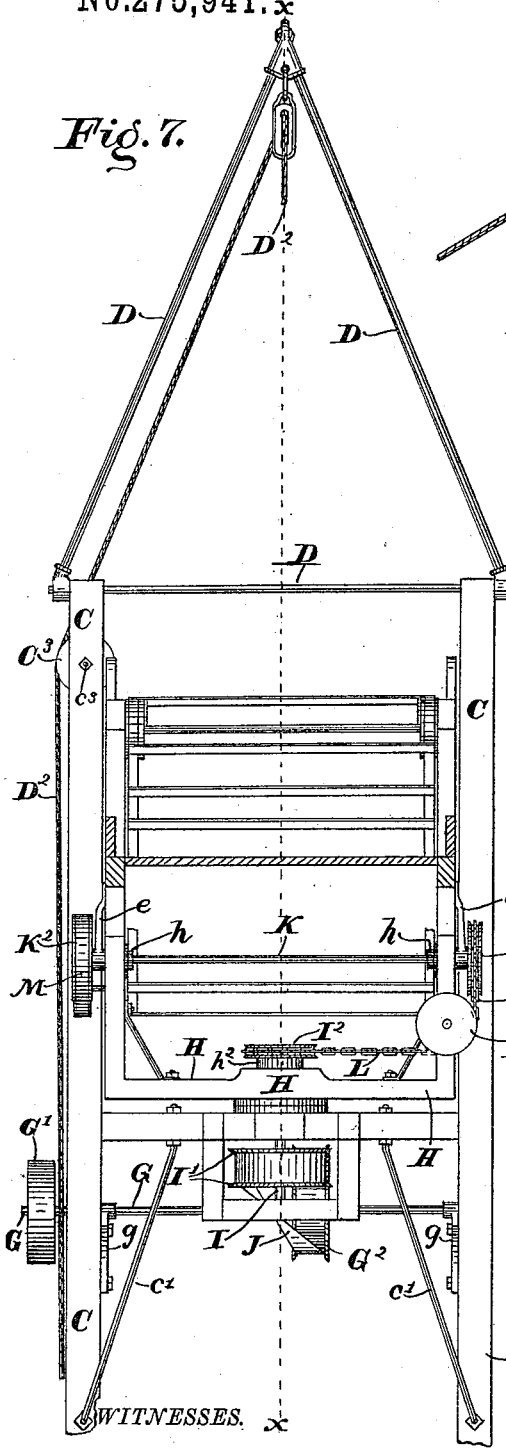
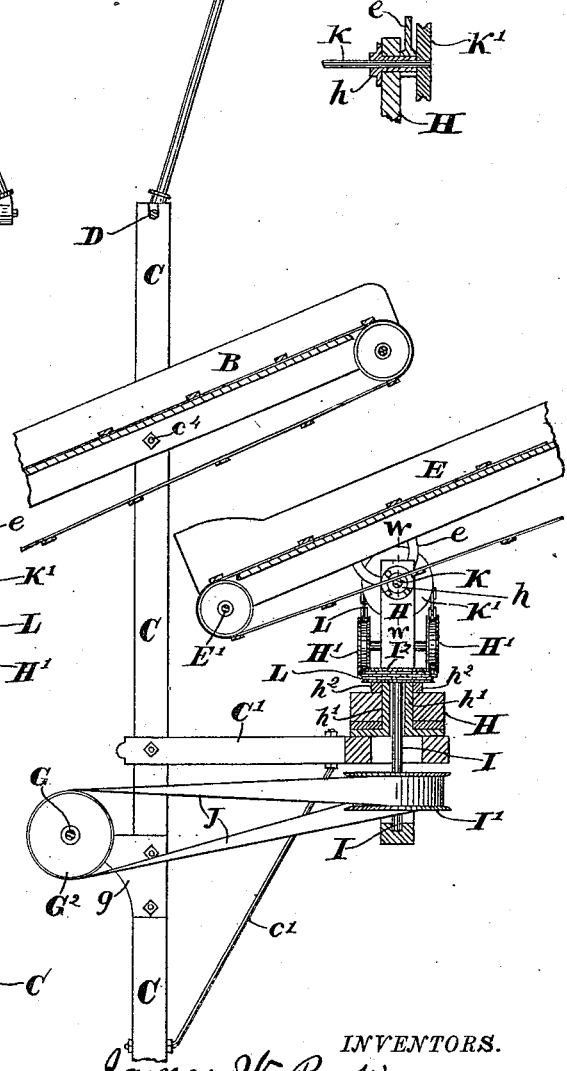
WITNESSES.
Chas. N. Leonard.
E. W. Bradford.
INVENTORS.
James W. Perkinson,
and Charles E. Merrifield,
PER
C. Bradford
ATTORNEY.

UNITED STATES PATENT OFFICE.

JAMES W. PERKINSON, OF COLUMBUS, AND CHARLES E. MERRIFIELD, OF INDIANAPOLIS, INDIANA.

STRAW-STACKER.

SPECIFICATION forming part of Letters Patent No. 275,941, dated April 17, 1883.

Application filed November 27, 1882. (No model.)

*To all whom it may concern:*

Be it known that we, JAMES W. PERKINSON, of Columbus, Bartholomew county, and CHARLES E. MERRIFIELD, of Indianapolis, Marion county, in the State of Indiana, have invented certain new and useful Improvements in Straw-Stackers, of which the following is a specification.

Our invention consists in certain improvements in that class of straw-carriers which are used to supplement the short carriers usually attached to thrashing-machines, in order to carry the straw to the top of higher or larger stacks. Said improvements will be first fully described, and then pointed out in the claims.

Referring to the accompanying drawings, which are made a part hereof, and on which similar letters of reference indicate similar parts, Figure 1 is a perspective view of a portion of a thrashing-machine, one of my improved carriers attached thereto, and a straw-stack; Fig. 2, a side elevation of the portions involving our invention on an enlarged scale; Fig. 3, a view of the same as seen from the dotted line $z\ z$ in Fig. 2; Fig. 4, an under side plan of the same as seen when looking upwardly from the dotted line $y\ y$ in Fig. 2; Fig. 5, a vertical sectional view, looking to the right from the dotted line $x\ x$ in Fig. 3; Fig. 6, a portion of Fig. 5 on an enlarged scale; Fig. 7, a view, on an enlarged scale, of the principal portion of Fig. 3; Fig. 8, a view similar to but including more than Fig. 5, also on an enlarged scale, as seen when looking toward the right from the dotted line $x\ x$; and Fig. 9, a detail sectional view on the dotted line $w\ w$ in Fig. 8.

In said drawings, the portions marked A represent the thrashing-machine; B, the carrier attached thereto; C, the supporting posts or frame-work; C', a projecting portion thereof; D, a derrick thereon; E, the supplemental carrier; F, a belt running from a pulley on the machine A to a pulley on a shaft on the frame-work C; G, said shaft; H, a yoke mounted on the portion C' of the frame-work C; I, a shaft mounted in said portion C and passing up through said yoke; J, a belt connecting pulleys on the shafts G and I; K, a shaft mounted on the yoke H; L, a chain or rope belt connecting pulleys on the shafts I and K, and M a belt connecting the pulley $K^2$ on the shaft K with a similar pulley on the shaft E' of the carrier E.

The machine A may be any thrashing-machine capable of ordinary use, and should be provided with a pulley, $a$, from which to run a belt to the carrier.

The carrier B is the ordinary straw-carrier usually attached to a thrashing-machine, and is driven in the ordinary manner.

The supporting frame-work consists mainly of two upright posts, C. A bracket-like portion, C', is attached to said posts, preferably by bolts $c$ and braces $c'$, and supports the yoke and supplemental carrier, and the mechanism by which said carrier is driven. The upper ends of the posts are formed into bearings (preferably by being simply cut out or forked) to receive the cross-rod of the derrick D. Upon one post, at a convenient distance from the bottom, are brackets $c^2$, in which are bearings for the shaft of the spool $C^2$. Near the top of the same post is a sheave, $C^3$, mounted on a stud-shaft, $c^3$. The carrier B is supported by this frame by the bolt $c^4$, which passes through the posts C and the sides of said carrier simply.

The derrick D consists, preferably, of a triangular frame-work of gas-pipe, joined together by cast corner-pieces of suitable form, as shown. A pulley, D', is suspended thereto at the top, and a rope, $D^2$, runs from a point near the extremity of the carrier E over said pulley, and over the sheave $C^3$ to the spool $C^2$. When it is desired to elevate the carrier E said spool is rotated so as to wind up the rope $D^2$, and when it is desired to lower said carrier said spool is rotated so as to unwind said rope. Said derrick, being placed upon the top of the posts C, is much shorter and smaller, and consequently much less costly, than the ordinary derricks used for this purpose. A guy-rope, $D^3$, runs from the top of the derrick D to a belaying-pin, $a'$, on the machine A, or to some other fixed point, and thus supports said derrick in position.

The carrier E is similar to ordinary straw and like carriers, consisting of a frame-work or way and the traveling portion or carrier proper. It has supporting-brackets $e$, which rest on bearings $h$ on the yoke H, through which the shaft K passes. The shafts are thus protected from the weight of the carrier, and the coincidence of the axes of the shaft and the pivots for the carrier is at the same time preserved, which is important, in order that the tension on the belt M may not be disturbed.

The belt F is an ordinary driving-belt, by which the carrier mechanism is driven.

The shaft G rests in brackets $g$ on the posts C, and bears the pulleys G' and $G^2$, upon the former of which the belt F runs, and the latter of which the belt J connects with the pulley I' upon the shaft I.

The yoke H is a frame composed of a horizontal and two upright pieces strongly attached together, and is supported by the frame portion C', upon which it is mounted in much the same manner that a bolster is mounted upon the axle of a wagon. It is attached to said frame portion by forming upon the lower plate of the "fifth-wheel" (see Fig. 5) an upwardly-projecting stem, $h'$, which passes up through the upper plate and the yoke, and has a nut or collar, $h^2$, upon its upper end.

The shaft I rests upon a step or bearing attached to the lower side of the portion C', and passes up through the stem $h'$, which is made hollow to receive it. It bears the pulleys I' and $I^2$, to the former of which the belt J runs, and the latter of which the chain or rope belt L connects with the pulley K' upon the shaft K.

The belt J, which connects the pulleys $G^2$ and I', runs at a half-twist, as is necessary when connecting two shafts which run at right angles.

The shaft K is mounted in bearings $h$ in the yoke H, and revolves therein. Said bearings are also extended to form pivots for the brackets $e$, and thus the axis of rotation of the shaft and that of the carrier are rendered coincident. It bears the pulleys K' $K^2$, to the former of which the chain belt L runs, and the latter of which the belt M connects with a corresponding pulley on the shaft E'.

The chain or rope belt L passes from the pulley $I^2$ on the shaft I, around sheaves H' on the yoke H, to the pulley K' on the shaft K. By this arrangement power is transmitted from the vertical to the horizontal shaft in such a manner that the rotation of the yoke or the carrier on their respective pivots will not disturb the means of transmission nor alter the relation of the shafts to each other.

The belt M runs from the pulley $K^2$ on the shaft K to the pulley on the shaft E' on the carrier E, and thereby drives the traveling portion of said carrier in the ordinary manner.

As will be readily understood from the foregoing description, our improved carrier can be moved so as to deliver the straw at any point desired within its radius without stopping or interfering with the operation of the machine. It is very simple in construction, and therefore is not liable to get out of order, while it can be set up or taken down very speedily and easily.

Having thus fully described our said invention, what we claim as new, and desire to secure by Letters Patent, is—

1. The combination of the machine A, the two carriers B and E, the supporting-frame C, the derrick D, mounted on said frame, the ropes $D^2$ $D^3$, the pulley D', sheave $C^3$, and spool $C^2$, substantially as described, and for the purposes specified.

2. The combination, with a straw-stacker and its frame-work C, of a derrick, D, consisting of a triangular frame-work composed of three bars or pipes and connecting corner-pieces, as shown, and mounted in the top of said frame-work, substantially as shown and specified.

3. The combination of the machine A, the carriers B and E, the derrick D, the supporting frame-work C, the bracket-like portion C' thereon, the yoke H, the shafts G, I, K, and E', the pulleys on said several shafts, the sheaves H' H', and the belts F, J, L, and M, substantially as shown and described, and for the purposes specified.

4. The combination of the machine A, carriers B and E, supporting-frame C, derrick D, yoke H, shafts G, I, K, and E', and belts F, J, L, and M, substantially as described, and for the purposes specified.

In witness whereof we have hereunto set our hands and seals, at Indianapolis, Indiana, this 21st day of November, A. D. 1882.

JAMES W. PERKINSON. [L. S.]
CHARLES E. MERRIFIELD. [L. S.]

In presence of—
C. BRADFORD,
E. W. BRADFORD.